US012447727B2

(12) United States Patent
Matsushima et al.

(10) Patent No.: US 12,447,727 B2
(45) Date of Patent: Oct. 21, 2025

(54) LAMINATING DEVICE, AND MANUFACTURING DEVICE FOR LAMINATED ELECTRODE ASSEMBLY

(71) Applicant: Panasonic Holdings Corporation, Osaka (JP)

(72) Inventors: Hiroyuki Matsushima, Osaka (JP); Masahide Maruyama, Nara (JP)

(73) Assignee: Panasonic Holdings Corporation, Osaka (JP)

( * ) Notice: Subject to any disclaimer, the term of this patent is extended or adjusted under 35 U.S.C. 154(b) by 615 days.

(21) Appl. No.: 17/794,845

(22) PCT Filed: Nov. 30, 2020

(86) PCT No.: PCT/JP2020/044533
§ 371 (c)(1),
(2) Date: Jul. 22, 2022

(87) PCT Pub. No.: WO2021/152993
PCT Pub. Date: Aug. 5, 2021

(65) Prior Publication Data
US 2023/0139972 A1    May 4, 2023

(30) Foreign Application Priority Data
Jan. 27, 2020   (JP) .................. 2020-010858

(51) Int. Cl.
*B32B 37/00*    (2006.01)
*B32B 38/18*    (2006.01)

(52) U.S. Cl.
CPC ........ *B32B 37/0053* (2013.01); *B32B 38/185* (2013.01); *B32B 2309/70* (2013.01); *B32B 2457/10* (2013.01)

(58) Field of Classification Search
CPC ............. B32B 37/0053; B32B 38/185; B32B 2309/70; Y02P 70/50; H01M 10/0404;
(Continued)

(56) References Cited

U.S. PATENT DOCUMENTS 7,278,203 B2 * 10/2007 Aoyama ................ H05K 13/02
414/752.1
8,845,839 B2 * 9/2014 Yuhara ................ B32B 37/0046
156/228

(Continued)

FOREIGN PATENT DOCUMENTS

EP    3 395 309 A1    10/2018
EP    4 082 730 A1    11/2022
(Continued)

OTHER PUBLICATIONS

International Search Report issued in corresponding International Application No. PCT/JP2020/044533, dated Jan. 26, 2021, with English translation.
(Continued)

*Primary Examiner* — Donghai D Nguyen
(74) *Attorney, Agent, or Firm* — Rimon P.C.

(57) ABSTRACT

A laminating device includes: multiple laminating heads that each hold a unit laminated body; a drum section that holds multiple laminating heads; a drum drive unit that rotates the drum section to advance each laminating head to a laminating position that faces a lamination stage; and multiple head drive units that move the respective laminating heads independently of the move made by the rotation of the drum section. A head drive unit for a laminating head that has reached the laminating position drives the laminating head such as to offset the advancement of the laminating head made by the rotation of the drum section. Each laminating
(Continued)

head discharges, onto the lamination stage, a unit laminated body so that multiple unit laminated bodies are laminated.

4 Claims, 5 Drawing Sheets

(58) Field of Classification Search
CPC .......... H01M 10/0585; Y10T 29/53135; Y10T 29/53191; Y10T 29/53265; Y10T 29/49108
See application file for complete search history.

(56) References Cited

U.S. PATENT DOCUMENTS

| | | |
|---|---|---|
| 11,345,556 B2* | 5/2022 | Sato ........................ B65H 27/00 |
| 2021/0184240 A1 | 6/2021 | Yamashita |
| 2022/0173427 A1 | 6/2022 | Inagaki et al. |
| 2022/0355499 A1 | 11/2022 | Matsushima et al. |

FOREIGN PATENT DOCUMENTS

| | | |
|---|---|---|
| JP | 2011-086508 A | 4/2011 |
| WO | 2019220875 A1 | 11/2019 |
| WO | 2020203114 A1 | 10/2020 |

OTHER PUBLICATIONS

Extended European Search Report issued in corresponding European Patent Application No. 20917251.9, dated Jun. 19, 2023.

* cited by examiner

LAMINATING DEVICE, AND MANUFACTURING DEVICE FOR LAMINATED ELECTRODE ASSEMBLY

CROSS-REFERENCE TO RELATED APPLICATIONS

This application is the U.S. National Phase under 35 U.S.C. § 371 of International Patent Application No. PCT/JP2020/044533, filed on Nov. 30, 2020, which in turn claims the benefit of Japanese Patent Application No. 2020-010858, filed on Jan. 27, 2020, the entire content of each of which is incorporated herein by reference.

BACKGROUND

Field of the Invention

The present disclosure relates to a laminating device, and a manufacturing device for a laminated electrode assembly.

Description of the Related Art

As in-vehicle batteries, for example, laminate-type batteries have been developed. Such a battery has a structure in which a container contains a laminated electrode assembly, in which multiple positive electrodes and multiple negative electrodes are alternatively laminated with a separator in between, and an electrolyte.

With regard to such a battery, Patent Literature 1 discloses a device for manufacturing a laminated electrode assembly in which a positive electrode, a negative electrode, and a separator are laminated, using, as materials, a continuous positive electrode material in which positive electrodes are continuously formed with a break line provided in between, a continuous negative electrode material in which negative electrodes are continuously formed with a break line provided in between, and a continuous separator material in which separators are continuously formed with a break line provided in between. This manufacturing device has a structure in which a continuous battery material, formed by superimposing the materials over each other, is wound around a winding drum a required number of times, and a side circumferential surface of the winding drum is partially projected in a radial direction to cut the continuous battery material at each break line.

Patent Literature 1: Japanese Unexamined Patent Application Publication No. 2011-86508

With the abovementioned conventional manufacturing device, individual laminated electrode assemblies are manufactured by breaking the continuous battery material, wound around the drum, along the break lines. Accordingly, each time after the continuous battery material is wound a required number of times around the drum, the drum needs to be stopped before the continuous battery material is cut, so that continuous manufacturing of the laminated electrode assemblies has been difficult. Therefore, it has been difficult to speed up the manufacturing of laminated electrode assemblies.

SUMMARY OF THE INVENTION

The present disclosure has been made in view of such a situation, and a purpose thereof is to provide a technology for enabling speed-up of the manufacturing of laminated electrode assemblies.

One aspect of the present disclosure relates to a laminating device. The laminating device includes: multiple laminating heads that each hold a unit laminated body in which a separator and an electrode plate are laminated; a drum section that holds multiple laminating heads arranged on its circumference; a drum drive unit that rotates the drum section to advance each laminating head to a laminating position that faces a lamination stage; and multiple head drive units that move the respective laminating heads independently of the move made by the rotation of the drum section. A head drive unit for a laminating head that has reached the laminating position drives the laminating head such as to offset the advancement of the laminating head made by the rotation of the drum section. Each laminating head discharges, onto the lamination stage, a unit laminated body that the laminating head has been holding, so that multiple unit laminated bodies are laminated.

Another aspect of the present disclosure relates to a manufacturing device for a laminated electrode assembly. The manufacturing device includes: a first electrode cutting drum that cuts a continuous body of multiple first electrode plates into multiple first electrode plates and conveys the first electrode plates; a second electrode cutting drum that cuts a continuous body of multiple second electrode plates into multiple second electrode plates and conveys the second electrode plates; a bonding drum that laminates and bonds a first separator continuous body in which multiple first separators are continuously arranged, multiple first electrode plates supplied from the first electrode cutting drum, a second separator continuous body in which multiple second separators are continuously arranged, and multiple second electrode plates supplied from the second electrode cutting drum in this order, so as to form a continuous laminated body in which unit laminated bodies, which each are constituted by a first separator, a first electrode plate, a second separator, and a second electrode plate, are continuously arranged; a separator cutting drum that cuts the first separator continuous body and the second separator continuous body in the continuous laminated body to obtain multiple unit laminated bodies; and a laminating drum that is constituted by the laminating device according to the one aspect and that laminates multiple unit laminated bodies on a lamination stage to form a laminated electrode assembly.

Optional combinations of the aforementioned constituting elements, and implementation of the present disclosure in the form of methods, apparatuses, or systems may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
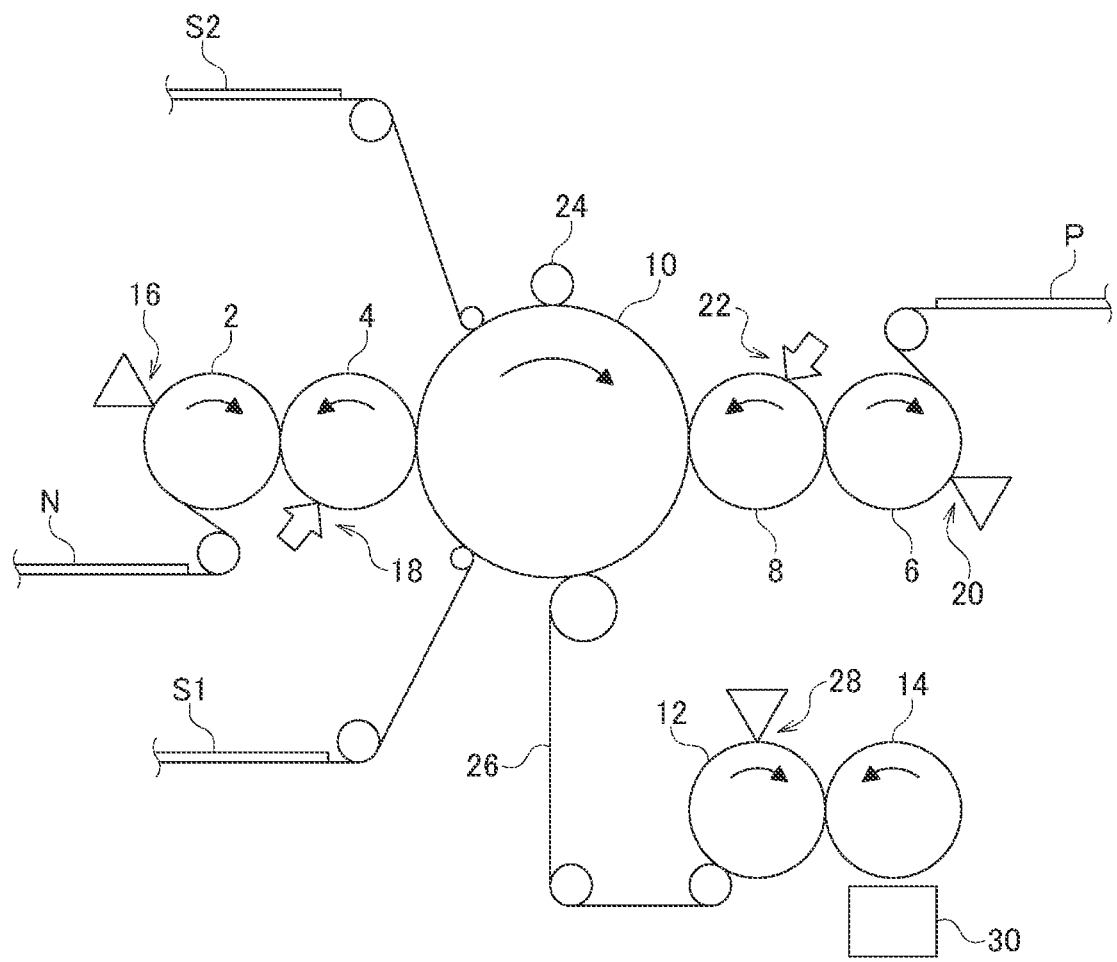
FIG. 1 is a schematic diagram of a manufacturing device for a laminated electrode assembly according to an embodiment.

In the following, the present disclosure will be described based on a preferred embodiment with reference to the drawings. The embodiment is intended to be illustrative only and not to limit the present disclosure, so that it should be understood that not all of the features or combinations thereof described in the embodiment are necessarily essential to the present disclosure. Like reference characters denote like or corresponding constituting elements, members, and processes in each drawing, and repetitive description will be omitted as appropriate.

Also, the scale or shape of each component shown in each drawing is defined for the sake of convenience to facilitate the explanation and is not to be regarded as limitative unless otherwise specified. Further, when the terms "first", "second", and the like are used in the present specification or claims, such terms do not imply any order or degree of importance and are used to distinguish one configuration from another, unless otherwise specified. Further, in each drawing, part of members less important in describing the embodiment may be omitted.

FIG. 1 is a schematic diagram of a manufacturing device for a laminated electrode assembly according to an embodiment. A manufacturing device 1 for a laminated electrode assembly is a continuous drum-type manufacturing device in which multiple drums are combined. Performing each process of cutting, heating, bonding, laminating, and the like of electrode bodies and separators on the drums enables high-speed and continuous manufacturing of laminated electrode assemblies. The laminated electrode assemblies may be used, for example, for lithium-ion secondary batteries.

The manufacturing device 1 includes a first electrode cutting drum 2, a first electrode heating drum 4, a second electrode cutting drum 6, a second electrode heating drum 8, a bonding drum 10, a separator cutting drum 12, and a laminating drum 14.

The first electrode cutting drum 2 cuts a continuous body of multiple first electrode plates into multiple individual first electrode plates and conveys the plates. The first electrode cutting drum 2 has a first radius and rotates at a first angular velocity around the central axis. In the present embodiment, the first electrode is a negative electrode. To the first electrode cutting drum 2, a strip-shaped first electrode continuous body N as the continuous body of multiple first electrode plates is supplied. The first electrode continuous body N includes a first electrode current collector and a first electrode active material layer. The first electrode active material layer is laminated on the first electrode current collector. In the present embodiment, the first electrode active material layer is laminated on the both sides of the first electrode current collector, but the first electrode active material layer may be laminated on only one side of the first electrode current collector.

Each of the first electrode current collector and the first electrode active material layer can be made of a publicly-known material and has a publicly-known structure. The first electrode current collector may be, for example, constituted by foil or a porous body made of copper, aluminum, or the like. The first electrode active material layer may be formed by applying, onto a surface of the first electrode current collector, first electrode mixture slurry containing a first electrode active material, a binder, a dispersant, and the like and by drying and rolling the applied film. The thickness of the first electrode current collector may be in the range from 3 μm to 50 μm inclusive, for example. Also, the thickness of the first electrode active material layer may be in the range from 10 μm to 100 μm inclusive, for example.

The first electrode cutting drum 2 includes multiple holding heads arranged in a circumferential direction of the drum, and a cutting blade that cuts the first electrode continuous body N into multiple individual first electrode plates. Each of the multiple holding heads includes a holding surface that adsorbs and holds the first electrode continuous body N. The holding surface of each holding head faces outward from the first electrode cutting drum 2. The first electrode continuous body N supplied to the first electrode cutting drum 2 is conveyed by the rotation of the first electrode cutting drum 2 while being adsorbed and held by the holding surfaces of the multiple holding heads.

Each of the multiple holding heads rotates around the central axis of the first electrode cutting drum 2 and can also move in a circumferential direction of the drum independently of other holding heads. Relative movement of each holding head is achieved by mounting thereon a motor that is different from the motor used to rotate the first electrode cutting drum 2. For example, if two holding heads adjacent to each other in a circumferential direction are assumed to be a first holding head and a second holding head, the first and second holding heads rotate around the central axis of the first electrode cutting drum 2 at a constant speed by means of the rotation of the first electrode cutting drum 2. Also, by the driving of the motor of each holding head, the relative speed of the two holding heads can be changed in a certain section on the circumference of the drum.

For example, at one timing, both the first and second holding heads rotate at a constant speed and have a relative speed of zero; at another timing, the first holding head increases its speed in a direction away from the subsequent second holding head, so that the holding heads have a finite relative speed. Such independent driving of the holding heads enables adjustment of the positions of cutting by the cutting blade in the first electrode continuous body N and also enables adjustment of the positions of the individually divided first electrode plates, for example. When each holding head should be rotated at a constant speed around the central axis of the first electrode cutting drum 2, to the movement of each holding head made by the rotation of the first electrode cutting drum 2, constant speed movement of each holding head made by the driving of the motor of each holding head may be added.

The first electrode cutting drum 2 adsorbs and holds the supplied first electrode continuous body N and rotates to convey the first electrode continuous body N. At a cutting position 16 schematically illustrated in FIG. 1, the first electrode cutting drum 2 cuts the first electrode continuous body N to produce the first electrode plates. The first electrode continuous body N is cut by the cutting blade at a position between adjacent holding heads, so that multiple individual first electrode plates are obtained. Each first electrode plate thus obtained is conveyed while being adsorbed and held by each holding head. The first electrode cutting drum 2 may include various cameras. Such cameras can monitor the positions of the multiple produced first electrode plates. As an example, the position of the first electrode continuous body N before the cutting is monitored at a conveying roller located on the upstream side of the first electrode cutting drum 2. The first electrode cutting drum 2 may also include a sensor besides cameras to monitor the position of a holding head or the like.

The first electrode heating drum 4 is disposed in close proximity to the first electrode cutting drum 2. The first electrode heating drum 4 has a second radius and rotates at a second angular velocity around the central axis. The second radius of the first electrode heating drum 4 may be the same as or different from the first radius of the first electrode cutting drum 2. Meanwhile, the second angular velocity of the first electrode heating drum 4 is different from the first angular velocity of the first electrode cutting drum 2. Also, the second angular velocity of the first electrode heating drum 4 is set so that the linear velocity thereof is substantially identical with the linear velocity of the bonding drum 10, which will be described later.

As an example, the second radius may be identical with the first radius, and the second angular velocity may be set higher than the first angular velocity. In this case, the linear velocity of the first electrode heating drum 4 is larger than the linear velocity of the first electrode cutting drum 2. Therefore, before the proximity position between the first electrode cutting drum 2 and the first electrode heating drum 4, the speed of a holding head of the first electrode cutting drum 2 is temporarily increased until it becomes substantially identical with the linear velocity of the first electrode heating drum 4. As a result, the relative speed of the holding head with respect to the first electrode heating drum 4 becomes substantially zero. At the timing when the relative speed becomes substantially zero, the holding head discharges, to the first electrode heating drum 4 side, the first electrode plate that the holding head has adsorbed and held. After the discharge of the first electrode plate, the speed of the holding head returns to the speed before the increase of speed.

The first electrode heating drum 4 rotates while adsorbing and holding the first electrode plates discharged from the first electrode cutting drum 2 and preheats the first electrode plates with a built-in heater. The preheating is performed to thermally bond a first electrode plate and a separator in the subsequent bonding process. Although the first electrode plates are heated at a heating position 18 in the present embodiment, the position is not limited thereto. For example, the first electrode plates may be heated in the entire circumferential area of the first electrode heating drum 4.

The second electrode cutting drum 6 cuts a continuous body of multiple second electrode plates into multiple individual second electrode plates and conveys the plates. The second electrode cutting drum 6 has a third radius and rotates at a third angular velocity around the central axis. In the present embodiment, the second electrode is a positive electrode. To the second electrode cutting drum 6, a strip-shaped second electrode continuous body P as the continuous body of multiple second electrode plates is supplied. The second electrode continuous body P includes a second electrode current collector and a second electrode active material layer. The second electrode active material layer is laminated on the second electrode current collector. In the present embodiment, the second electrode active material layer is laminated on the both sides of the second electrode current collector, but the second electrode active material layer may be laminated on only one side of the second electrode current collector.

Each of the second electrode current collector and the second electrode active material layer can be made of a publicly-known material and has a publicly-known structure. The second electrode current collector may be, for example, constituted by foil or a porous body made of stainless steel, aluminum, or the like. The second electrode active material layer may be formed by applying, onto a surface of the second electrode current collector, second electrode mixture slurry containing a second electrode active material, a binder, a dispersant, and the like and by drying and rolling the applied film. The thickness of the second electrode current collector may be in the range from 3 µm to 50 µm inclusive, for example. Also, the thickness of the second electrode active material layer may be in the range from 10 µm to 100 µm inclusive, for example.

The second electrode cutting drum 6 includes multiple holding heads arranged in a circumferential direction of the drum, and a cutting blade that cuts the second electrode continuous body P into multiple individual second electrode plates. Each of the multiple holding heads includes a holding surface that adsorbs and holds the second electrode continuous body P. The holding surface of each holding head faces outward from the second electrode cutting drum 6. The second electrode continuous body P supplied to the second electrode cutting drum 6 is conveyed by the rotation of the second electrode cutting drum 6 while being adsorbed and held by the holding surfaces of the multiple holding heads.

Each of the multiple holding heads rotates around the central axis of the second electrode cutting drum 6 and can also move in a circumferential direction of the drum independently of other holding heads. Relative movement of each holding head is achieved by mounting thereon a motor that is different from the motor used to rotate the second electrode cutting drum 6. For example, a first holding head and a second holding head adjacent to each other in a circumferential direction rotate around the central axis of the second electrode cutting drum 6 at a constant speed by means of the rotation of the second electrode cutting drum 6. Also, by the driving of the motor of each holding head, the relative speed of the two holding heads can be changed in a certain section on the circumference of the drum. The change in the relative speed of the first and second holding heads and the combination of the rotation of the second electrode cutting drum 6 and the driving of the motors provided in the holding heads are the same as those in the case of the first electrode cutting drum 2.

The second electrode cutting drum 6 adsorbs and holds the supplied second electrode continuous body P and rotates to convey the second electrode continuous body P. At a cutting position 20 schematically illustrated in FIG. 1, the second electrode cutting drum 6 cuts the second electrode continuous body P to produce the second electrode plates. The second electrode continuous body P is cut by the cutting blade at a position between adjacent holding heads, so that multiple individual second electrode plates are obtained. Each second electrode plate thus obtained is conveyed while being adsorbed and held by each holding head. The second electrode cutting drum 6 may include various cameras. Such cameras can monitor the positions of the multiple produced second electrode plates. As an example, the position of the second electrode continuous body P before the cutting is monitored at a conveying roller located on the upstream side of the second electrode cutting drum 6. The second electrode cutting drum 6 may also include a sensor besides cameras to monitor the position of a holding head or the like.

The second electrode heating drum 8 is disposed in close proximity to the second electrode cutting drum 6. The second electrode heating drum 8 has a fourth radius and rotates at a fourth angular velocity around the central axis. The fourth radius of the second electrode heating drum 8 may be the same as or different from the third radius of the second electrode cutting drum 6. Meanwhile, the fourth angular velocity of the second electrode heating drum 8 is different from the third angular velocity of the second electrode cutting drum 6. Also, the fourth angular velocity of the second electrode heating drum 8 is set so that the linear velocity thereof is substantially identical with the linear velocity of the bonding drum 10.

As an example, the fourth radius may be identical with the third radius, and the fourth angular velocity may be set higher than the third angular velocity. In this case, the linear velocity of the second electrode heating drum 8 is larger than the linear velocity of the second electrode cutting drum 6. Therefore, before the proximity position between the second electrode cutting drum 6 and the second electrode heating drum 8, the speed of a holding head of the second electrode cutting drum 6 is temporarily increased until it becomes substantially identical with the linear velocity of the second electrode heating drum 8. As a result, the relative speed of the holding head with respect to the second electrode heating drum 8 becomes substantially zero. At the timing when the relative speed becomes substantially zero, the holding head discharges, to the second electrode heating drum 8 side, the second electrode plate that the holding head has adsorbed and held. After the discharge of the second electrode plate, the speed of the holding head returns to the speed before the increase of speed.

The second electrode heating drum 8 rotates while adsorbing and holding the second electrode plates discharged from the second electrode cutting drum 6 and preheats the second electrode plates with a built-in heater. The preheating is performed to thermally bond a second electrode plate and a separator in the subsequent bonding process. Although the second electrode plates are heated at a heating position 22 in the present embodiment, the position is not limited thereto. For example, the second electrode plates may be heated in the entire circumferential area of the second electrode heating drum 8.

The bonding drum 10 forms a continuous laminated body in which unit laminated bodies, which each are constituted by a first separator, a first electrode plate, a second separator, and a second electrode plate, are continuously arranged. The bonding drum 10 is disposed in close proximity to the first electrode heating drum 4 and the second electrode heating drum 8. The bonding drum 10 has a fifth radius and rotates at a fifth angular velocity around the central axis. To the bonding drum 10, a strip-shaped first separator continuous body S1, in which multiple first separators are continuously arranged, and a strip-shaped second separator continuous body S2, in which multiple second separators are continuously arranged, are supplied. On a surface of each of the first separator continuous body S1 and the second separator continuous body S2, a thermal bonding layer is provided. The thermal bonding layer has a property of developing no adhesiveness at room temperature but developing adhesiveness when heated. The thermal bonding layer may be, for example, a thermoplastic layer containing a thermoplastic polymer, which develops adhesiveness based on plastic deformation of the thermoplastic polymer caused by heating.

Also, to the bonding drum 10, multiple first electrode plates are supplied from the first electrode cutting drum 2 via the first electrode heating drum 4, and multiple second electrode plates are supplied from the second electrode cutting drum 6 via the second electrode heating drum 8. A first electrode plate is rotationally conveyed while being preheated on the first electrode heating drum 4 and is discharged, to the bonding drum 10 side, at the proximity position between the first electrode heating drum 4 and the bonding drum 10. A second electrode plate is rotationally conveyed while being preheated on the second electrode heating drum 8 and is discharged, to the bonding drum 10 side, at the proximity position between the second electrode heating drum 8 and the bonding drum 10.

The first separator continuous body S1, each first electrode plate, the second separator continuous body S2, and each second electrode plate are supplied to the bonding drum 10 at positions provided in the enumerated order from the upstream side of the rotational direction of the bonding drum 10. Accordingly, the first separator continuous body S1 is supplied to the bonding drum 10 first at a certain position. The first separator continuous body S1 is adsorbed and held by the bonding drum 10 and rotationally conveyed. Subsequently, at a position on the downstream side of the supply position of the first separator continuous body S1, the first electrode plates are supplied from the first electrode heating drum 4 to the bonding drum 10 and placed on the first separator continuous body S1. The multiple first electrode plates are arranged on the first separator continuous body S1 at predetermined intervals in the conveying direction of the first separator continuous body S1.

Subsequently, at a position on the downstream side of the supply position of the first electrode plates, the second separator continuous body S2 is supplied to the bonding drum 10 and placed over the multiple first electrode plates. Thereafter, the first separator continuous body S1, multiple first electrode plates, and second separator continuous body S2 are pressurized by a thermocompression bonding roller 24, at a position on the downstream side of the supply position of the second separator continuous body S2. Accordingly, the first separator continuous body S1, each first electrode plate, and the second separator continuous body S2 are bonded together. Subsequently, at a position on the downstream side of the position of pressure bonding by the thermocompression bonding roller 24, the second electrode plates are supplied from the second electrode heating drum 8 to the bonding drum 10 and placed on the second separator continuous body S2. The multiple second electrode plates are arranged on the second separator continuous body S2 at predetermined intervals in the conveying direction of the second separator continuous body S2. Also, the multiple second electrode plates are bonded to the second separator continuous body S2 by the pressing force of the second electrode heating drum 8.

Through the process described above, the first separator continuous body S1, multiple first electrode plates, second separator continuous body S2, and multiple second electrode plates are laminated in this order and bonded to each other, forming a continuous laminated body 26. The continuous laminated body 26 has a structure in which the unit laminated bodies, which each are constituted by a first separator, a first electrode plate, a second separator, and a second electrode plate, are continuously connected by the first separator continuous body S1 and the second separator continuous body S2. The continuous laminated body 26 is conveyed from the bonding drum 10 to the separator cutting drum 12. By halting the supply of the second electrode plates from the second electrode cutting drum 6 side, three-layered unit laminated bodies without the second electrode plates may be produced after every fixed number of pieces. The electrode plates of which supply is halted may also be the first electrode plates.

The separator cutting drum 12 cuts the first separator continuous body S1 and the second separator continuous body S2 in the continuous laminated body 26 to obtain multiple individual unit laminated bodies. The separator cutting drum 12 has a sixth radius and rotates at a sixth angular velocity around the central axis. The separator cutting drum 12 includes multiple holding heads arranged in a circumferential direction of the drum, and a cutting blade that cuts the continuous laminated body 26 into multiple individual unit laminated bodies. Each of the multiple holding heads includes a holding surface that adsorbs and holds the continuous laminated body 26. The holding surface of each holding head faces outward from the separator cutting drum 12. The continuous laminated body 26 supplied to the separator cutting drum 12 is conveyed by the rotation of the separator cutting drum 12 while being adsorbed and held by the holding surfaces of the multiple holding heads.

Each of the multiple holding heads rotates around the central axis of the separator cutting drum 12 and may also be capable of moving in a circumferential direction of the drum independently of other holding heads. Relative movement of each holding head is achieved by mounting thereon a motor that is different from the motor used to rotate the separator cutting drum 12. For example, a first holding head and a second holding head adjacent to each other in a circumferential direction rotate around the central axis of the separator cutting drum 12 at a constant speed by means of the rotation of the separator cutting drum 12. Also, by the driving of the motor of each holding head, the relative speed of the two holding heads can be changed in a certain section on the circumference of the drum. The change in the relative speed of the first and second holding heads and the combination of the rotation of the separator cutting drum 12 and the driving of the motors provided in the holding heads are the same as those in the case of the first electrode cutting drum 2.

The separator cutting drum 12 adsorbs and holds the supplied continuous laminated body 26 and rotates to convey the continuous laminated body 26. At a cutting position 28 schematically illustrated in FIG. 1, the separator cutting drum 12 cuts the continuous laminated body 26 to produce the unit laminated bodies. The continuous laminated body 26 is cut by the cutting blade at a position between adjacent holding heads, so that multiple individual unit laminated bodies are obtained. At the time, in the continuous laminated body 26, the first separator continuous body S1 and the second separator continuous body S2 are cut at a position between electrode plates that are adjacent in the conveying direction of the continuous laminated body 26. Each unit laminated body thus obtained is conveyed while being adsorbed and held by each holding head. A holding head discharges, to the laminating drum 14 side, a unit laminated body that the holding head has adsorbed and held. The separator cutting drum 12 may include various cameras. Such cameras can monitor the positions of the multiple produced unit laminated bodies. As an example, the position of the continuous laminated body 26 before the cutting is monitored at a conveying roller located on the upstream side of the separator cutting drum 12. The separator cutting drum 12 may also include a sensor besides cameras to monitor the position of a holding head or the like.

The laminating drum 14 laminates multiple unit laminated bodies on a lamination stage 30 to form a laminated electrode assembly. The laminating drum 14 has a seventh radius and rotates at a seventh angular velocity around the central axis. The laminating drum 14 includes multiple laminating heads arranged in a circumferential direction of the drum. Each laminating head includes a holding surface that adsorbs and holds a unit laminated body. The holding surface of each laminating head faces outward from the laminating drum 14. Each of the multiple laminating heads rotates around the central axis of the laminating drum 14 and can also move in a circumferential direction of the drum independently of other laminating heads. Relative movement of each laminating head is achieved by mounting thereon a motor that is different from the motor used to rotate the laminating drum 14, as will be described later. Upon reaching a laminating position that faces the lamination stage 30, each laminating head 106 discharges, to the lamination stage 30 side, a unit laminated body that the laminating head 106 has been holding.

The lamination stage 30 is disposed immediately beneath the laminating drum 14. On the lamination stage 30, the unit laminated bodies discharged from the laminating drum 14 are sequentially laminated. Thus, a laminated electrode assembly is formed. The lamination stage 30 can be driven in an X-axis direction and a Y-axis direction perpendicular to each other. Also, a tilt angle on an X-Y plane of the lamination stage 30 can be adjusted. This enables adjustment of the positions in the X-axis direction and the Y-axis direction and the tilt angle of a unit laminated body discharged from the laminating drum 14, with respect to a unit laminated body already laminated on the lamination stage 30. The lamination stage 30 includes clicks at the four corners, and the multiple unit laminated bodies laminated on the lamination stage 30 are pressed and fixed by the clicks. Also, the multiple unit laminated bodies thus laminated are pressurized and/or heated to be bonded to each other.

Figure 2:
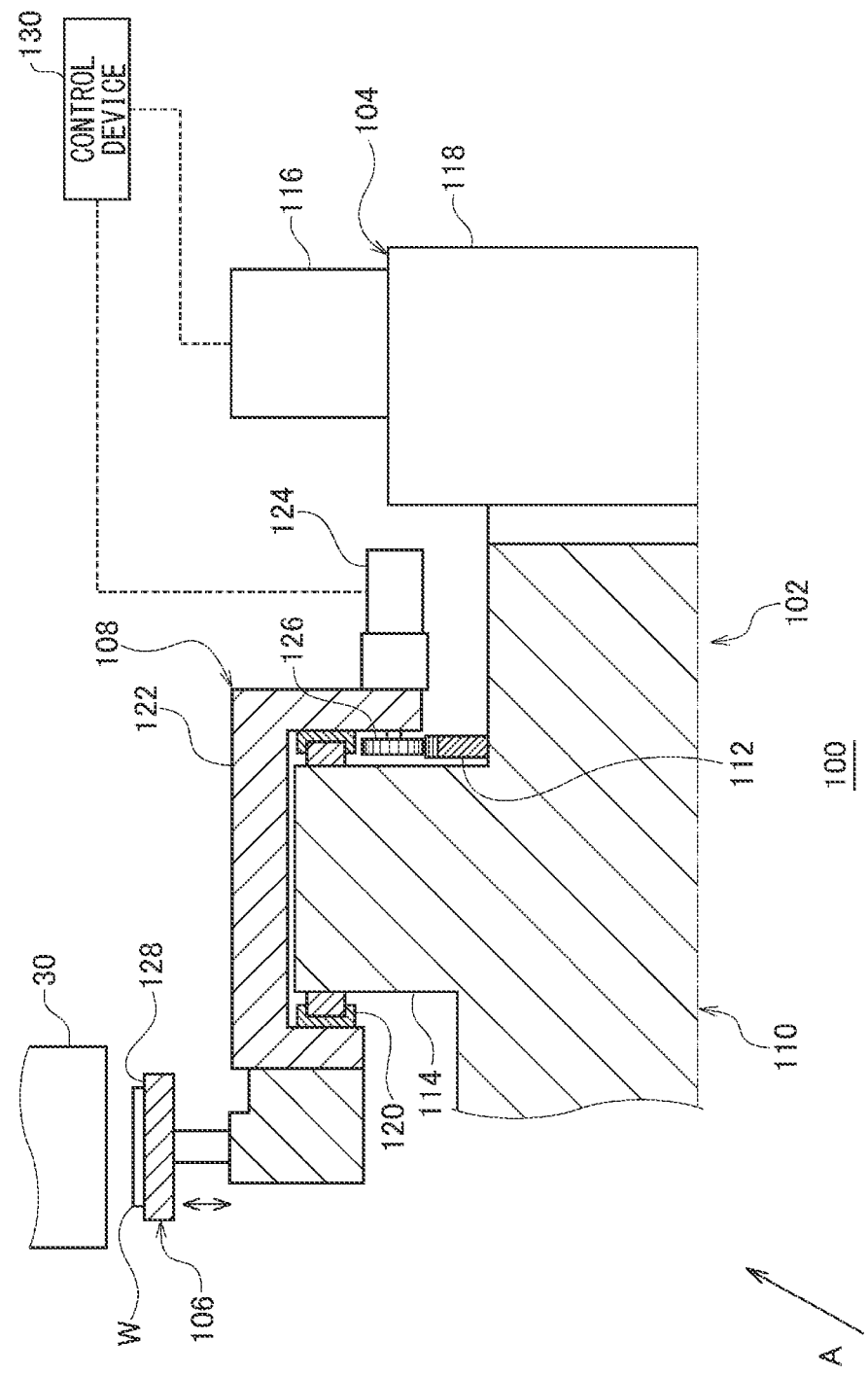
FIG. 2 is a sectional view that schematically illustrates part of a laminating device according to the embodiment.
Figure 3:
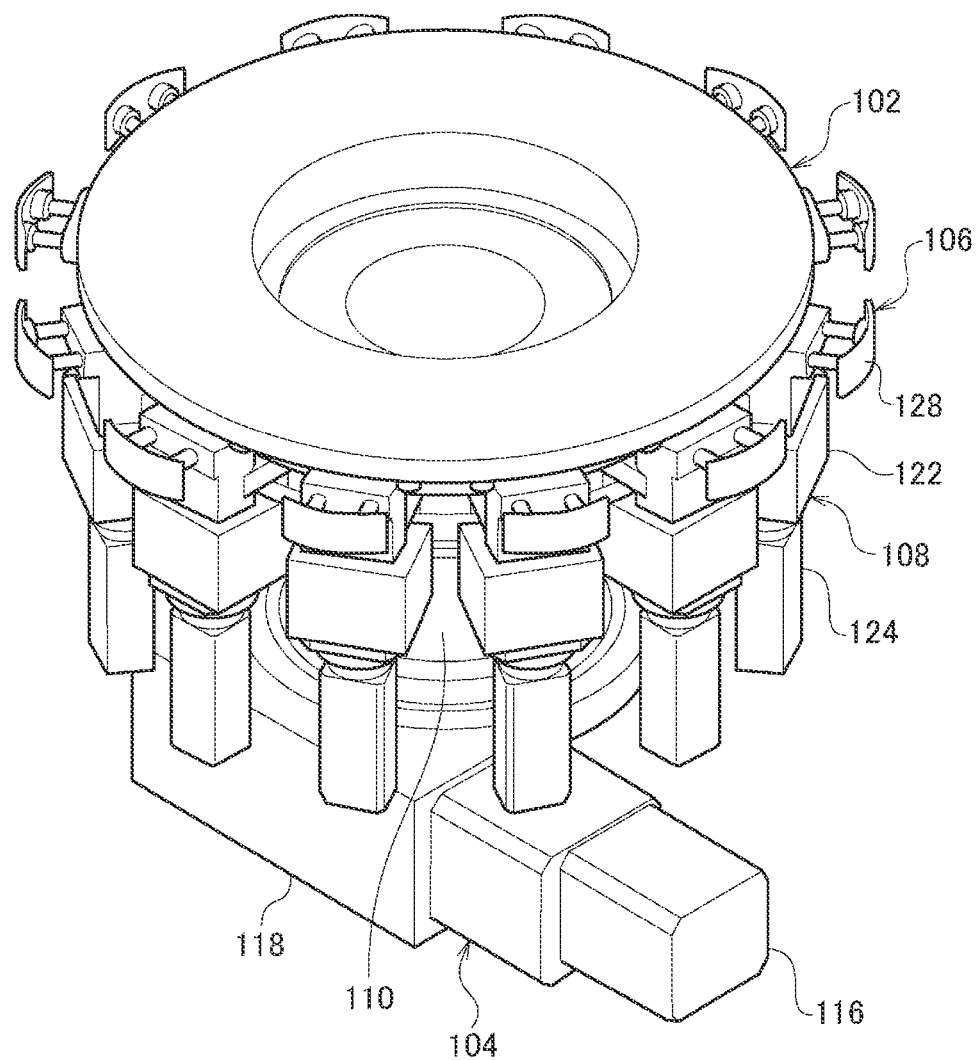
FIG. 3 is a perspective view of the laminating device according to the embodiment.

The laminating drum 14 is constituted by a laminating device 100 according to the present embodiment described below. FIG. 2 is a sectional view that schematically illustrates part of the laminating device 100 according to the embodiment. FIG. 3 is a perspective view of the laminating device 100 according to the embodiment. FIG. 2 illustrates half of a cross section of the laminating device 100. FIG. 3 illustrates the laminating device 100 observed from the direction of arrow A in FIG. 2.

The laminating device 100 constituting the laminating drum 14 includes a drum section 102, a drum drive unit 104, multiple laminating heads 106, and multiple head drive units 108. The drum section 102 holds the multiple laminating heads 106 arranged on its circumference. The drum drive unit 104 rotates the drum section 102 to advance each laminating head 106 to a laminating position facing the lamination stage 30. The head drive units 108 move the respective laminating heads 106 independently of the move thereof made by the rotation of the drum section 102.

The drum section 102 includes a rotating shaft 110, a large gear 112, and a flange portion 114. The drum drive unit 104 includes a motor 116 and a shaft base 118. The rotating shaft 110 may be of cylindrical shape, for example, and is connected at one end to the motor 116 via the shaft base 118. For the motor 116, a publicly-known motor may be used. The rotating shaft 110 rotates by means of the driving of the motor 116. The rotating shaft 110 corresponds to the central axis of the laminating drum 14. The large gear 112 is fixed to the rotating shaft 110. The large gear 112 of the present embodiment is fixed to an outer circumferential surface of the rotating shaft 110. Also, the large gear 112 is provided over the entire circumference of the rotating shaft 110. The flange portion 114 projects perpendicularly to an axial direction of the rotating shaft 110. The flange portion 114 is discoid and provided over the entire circumference of the rotating shaft 110. On a circumferential edge part of the flange portion 114, an arc guide 120 is provided.

The multiple head drive units 108 are arranged in a circumferential direction of the flange portion 114. Each head drive unit 108 includes a bracket 122, a motor 124, and a small gear 126. The bracket 122 has a substantial U-shape in cross section, and the both sides of the substantial U-shape sandwich an edge of the flange portion 114 via the arc guide 120. The motor 124 is supported by the bracket 122. For the motor 124, a publicly-known motor may be used. The small gear 126 is connected to the rotating shaft of the motor 124 and rotates by means of the driving of the motor 124. The small gear 126 meshes with the large gear 112 fixed to the rotating shaft 110 side. When the motor 124 is driven, the drive torque is transmitted to the large gear 112 that meshes with the small gear 126. This allows each head drive unit 108 to move independently on the circumference of the flange portion 114 along the arc guide 120.

The multiple laminating heads 106 are supported respectively by the head drive units 108. Accordingly, the multiple laminating heads 106 are arranged in a circumferential direction of the flange portion 114. When the rotating shaft 110 rotates, the rotary torque is transmitted to the small gear 126 that meshes with the large gear 112. Accordingly, each laminating head 106 rotates around the rotating shaft 110. Also, each laminating head 106 can move by means of a head drive unit 108, besides the move made by the rotation of the drum section 102.

For example, a first laminating head and a second laminating head adjacent to each other in a circumferential direction of the drum section 102 rotate around the central axis of the drum section 102 at a constant speed, by means of the rotation of the drum section 102. Also, the relative speed of those laminating heads can be changed in a certain section on the circumference of the drum section 102. For example, at one timing, both the first and second laminating heads rotate at a constant speed and have a relative speed of zero; at another timing, the first laminating head increases its speed in a direction away from the subsequent second laminating head, so that the laminating heads have a finite relative speed. When each laminating head 106 should be rotated at a constant speed around the central axis of the drum section 102, to the movement of each laminating head 106 made by the rotation of the drum section 102, constant speed movement of each laminating head 106 made by the driving of a corresponding head drive unit 108 may be added. The operation of each drive unit will be detailed later.

Each laminating head 106 includes a holding surface 128 that faces outward from the circumference of the drum section 102. Each holding surface 128 is positioned at a distance of the seventh radius from the center of the drum section 102. On each holding surface 128, an adsorption hole (not illustrated) is provided to adsorb and hold a unit laminated body W. Since air is sucked through the adsorption hole, the unit laminated body W is adsorbed and held by the suction force. The unit laminated body W has a structure in which separators and electrode plates are laminated. The unit laminated body W in the present embodiment is constituted by a first separator, a first electrode plate, a second separator, and a second electrode plate, as described previously. While being adsorbed and held by the holding surface 128 of each laminating head 106, each unit laminated body W is conveyed by the rotation of the drum section 102 or by the move of a corresponding head drive unit 108.

The operation of the drum drive unit 104 and the head drive units 108 is controlled by a control device 130. The control device 130 may be implemented by an element such as a CPU or memory of a computer or by a circuit as a hardware configuration, and by a computer program or the like as a software configuration. FIG. 2 illustrates a functional block implemented by cooperation of such components. It will be naturally understood by those skilled in the art that the functional block may be implemented in a variety of forms by combinations of hardware and software.

The control device 130 receives image data from a camera that images the laminating drum 14 and, based on the position of each laminating head 106 and the like derived from the image data, the control device 130 can control the operation of each part. The control device 130 may also acquire information from a sensor other than the camera to control the operation of each part. Also, each part of the laminating device 100 may be able to operate based on a preset operation program.

Figure 4A:
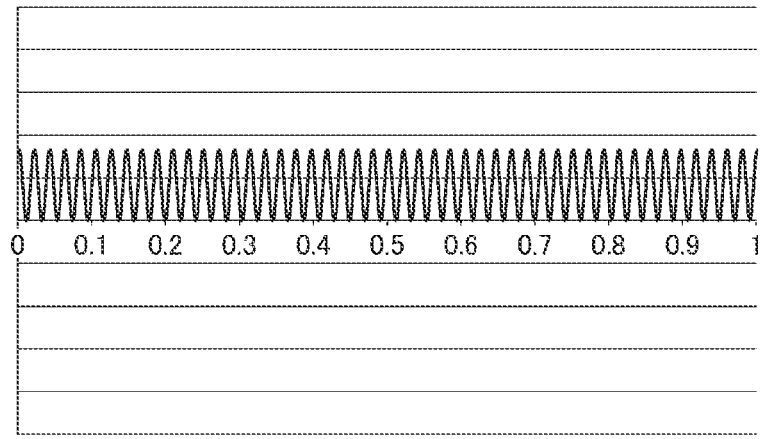
FIG. 4A is an operation waveform diagram of a drum drive unit.
Figure 4B:
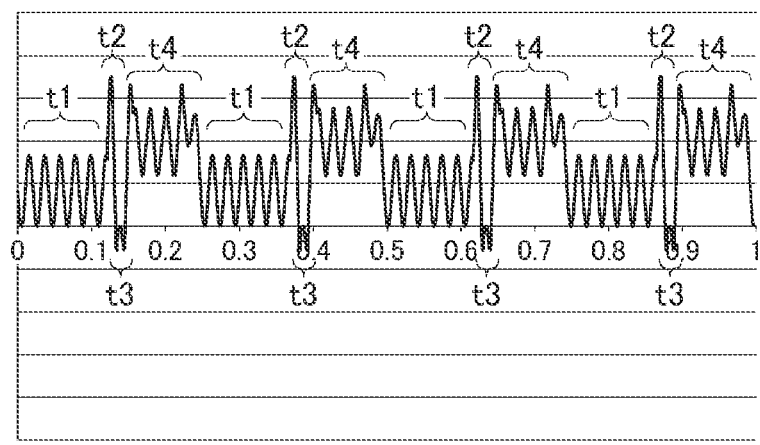
FIG. 4B is an operation waveform diagram of a head drive unit.
Figure 4C:
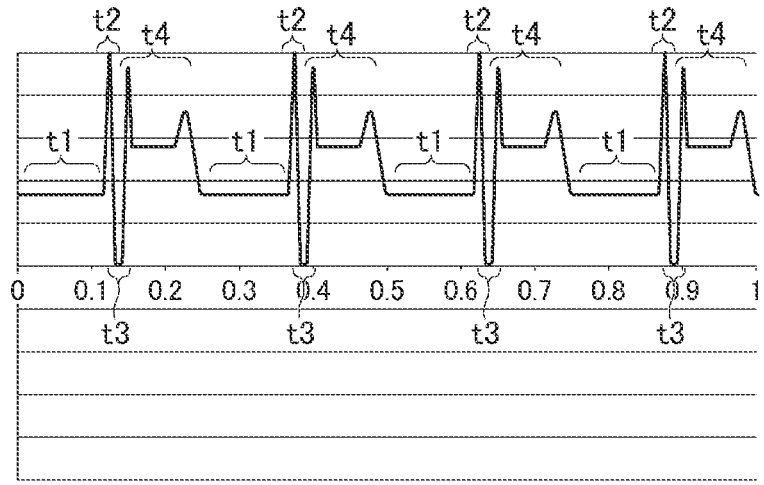
FIG. 4C is an operation waveform diagram of a laminating head.
Figure 5A:
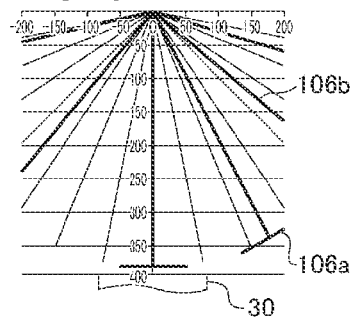
FIGS. 5A-5L are schematic diagrams that each illustrate moving states of laminating heads.
Figure 5E:
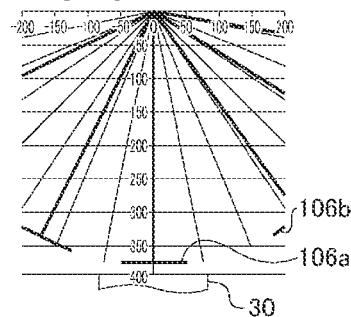
Figure 5I:
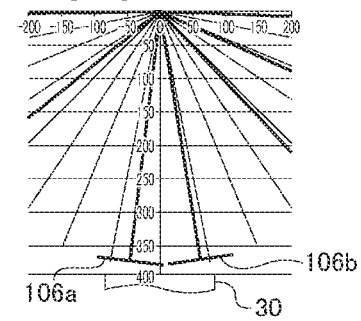
Figure 5B:
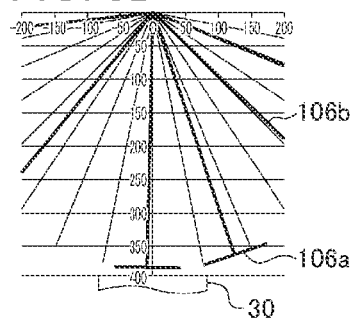
Figure 5F:
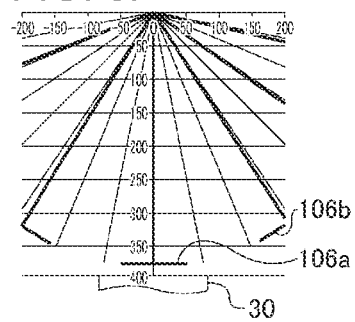
Figure 5J:
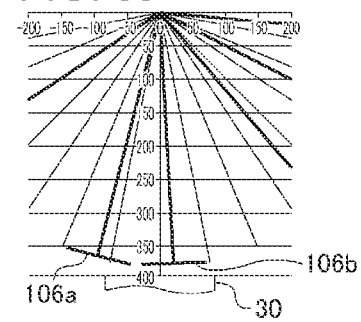
Figure 5C:
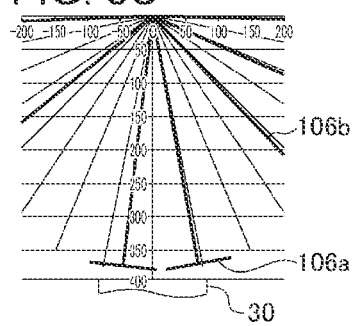
Figure 5G:
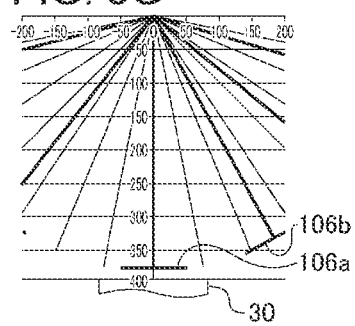
Figure 5K:
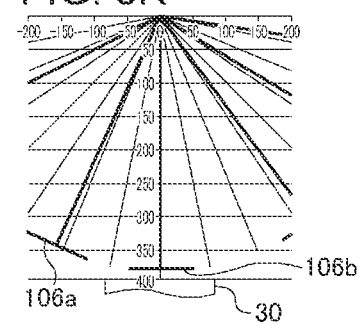
Figure 5D:
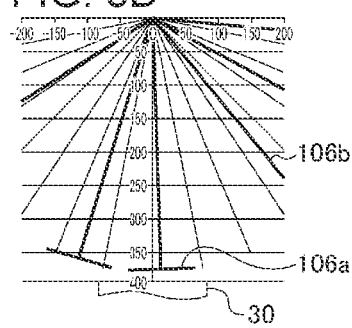
Figure 5H:
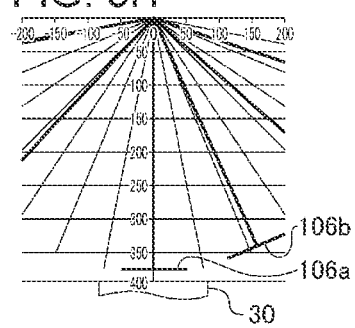
Figure 5L:
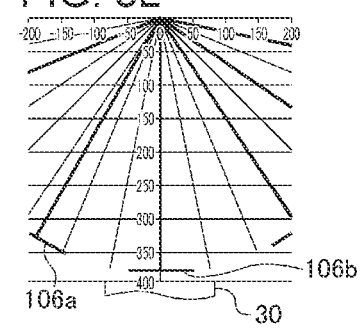

In the lamination process of each unit laminated body W, the operation of each part is controlled as follows. FIG. 4A is an operation waveform diagram of the drum drive unit 104. FIG. 4B is an operation waveform diagram of a head drive unit 108. FIG. 4C is an operation waveform diagram of a laminating head 106. In each of FIGS. 4A-4C, the horizontal axis represents time (relative values), and the vertical axis represents speed. FIGS. 5A-5L are schematic diagrams that each illustrate moving states of laminating heads 106. FIGS. 5A-5L focus on the movement of a certain laminating head 106a. Time passes in the order of FIGS. 5A to 5L, and the time interval between two consecutive figures is equal.

FIGS. 5A-5D show the states of the laminating head 106a during time t2 in FIGS. 4B and 4C. FIGS. 5E-5H show the states of the laminating head 106a during time t3 in FIGS. 4B and 4C. FIGS. 5I-5L show the states of the laminating head 106a during time t4 in FIGS. 4B and 4C.

The drum drive unit 104 is driven as shown by the operation waveform in FIG. 4A, so that the drum section 102 continuously rotates at a constant speed. Also, as shown in FIG. 4B, a head drive unit 108 repeats constant speed driving in the same direction as the rotating direction of the rotating shaft 110 (forward direction) during time t1. Accordingly, as shown in FIG. 4C, the laminating head 106a is conveyed at a constant speed during time t1 by means of the rotation of the drum section 102 and the move of the drum drive unit 104, so as to get closer to the lamination stage 30. Also, during time t1, the linear velocity of the laminating head 106a becomes substantially identical with the linear velocity of the separator cutting drum 12, and a unit laminated body W discharged from the separator cutting drum 12 is adsorbed by a laminating head 106.

When the laminating head 106a gets closer to the lamination stage 30 and reaches a position at a certain distance from the lamination stage 30, the corresponding head drive unit 108 accelerates the movement of the laminating head 106a in the rotating direction of the drum section 102. More specifically, as shown in FIGS. 4B and 4C, the head drive unit 108 increases the output during time t2 to accelerate the laminating head 106a and bring the laminating head 106a closer to the lamination stage 30. This widens the distance between the laminating head 106a and the subsequent laminating head 106b, as shown in FIGS. 5A-5D. As a result, the time for which the laminating head 106a is stopped at the laminating position can be spared.

When the laminating head 106a has reached the laminating position, the corresponding head drive unit 108 drives the laminating head 106a such as to offset the advancement of the laminating head 106a made by the rotation of the drum section 102. More specifically, as shown in FIG. 4B, the head drive unit 108 makes advancement in the opposite direction to the rotating direction of the drum section 102 during time t3. In other words, the head drive unit 108 rotates the motor 124 in the opposite direction. Thus, the direction of the movement of the laminating head 106a made by the head drive unit 108 is opposite to the direction of the movement of the laminating head 106a made by the drum drive unit 104, so that the moving speed of the laminating head 106*a* becomes zero, as shown in FIG. 4C. As a result, the laminating head 106*a* stops at the laminating position, as shown in FIGS. 5E-5H.

While stopping at the laminating position, the laminating head 106*a* discharges, onto the lamination stage 30, the unit laminated body W that the laminating head 106*a* has been holding. The laminating head 106 advances toward the lamination stage 30 at the laminating position, and, after discharging the unit laminated body W onto the lamination stage 30, the laminating head 106 recedes from the lamination stage 30. Since the unit laminated body W is discharged onto the lamination stage 30 while the movement of the laminating head 106 in a circumferential direction of the drum section 102 is stopped, the unit laminated body W can be discharged onto the lamination stage 30 with high positional accuracy.

After the laminating head 106*a* has discharged the unit laminated body W, the corresponding head drive unit 108 accelerates the movement of the laminating head 106*a* in the rotating direction of the drum section 102. More specifically, as shown in FIGS. 4B and 4C, the head drive unit 108 increases the output during time t4 to accelerate the laminating head 106*a* and displace the laminating head 106*a* from the lamination stage 30. This allows the subsequent laminating head 106*b* to advance to the laminating position while accelerating, as shown in FIGS. 5I-5L. The output of the head drive unit 108 during time t4 is set larger than the output of the head drive unit 108 during time t1.

Also, while the dimensional design is provided such that the circumference of the drum section 102 is divided into 16 so that 16 laminating heads 106 are mounted on the drum section 102, for example, 12 laminating heads 106 are mounted on the laminating device 100 of the present embodiment. Thus, by reducing the number of laminating heads 106 arranged on the circumference of the drum section 102 below the maximum number of laminating heads 106 that can be placed in design, the space between adjacent laminating heads 106 can be widened. This can expand the area where an arbitrary laminating head 106 can be accelerated or decelerated relative to an adjacent laminating head 106. Therefore, when a laminating head 106 is accelerated or decelerated before or after the laminating position, the change of speed can be made gradual.

As described above, the laminating device 100 according to the present embodiment includes: multiple laminating heads 106 that each hold a unit laminated body W in which a separator and an electrode plate are laminated; a drum section 102 that holds multiple laminating heads 106 arranged on its circumference; a drum drive unit 104 that rotates the drum section 102 to advance each laminating head 106 to a laminating position that faces a lamination stage 30; and multiple head drive units 108 that move the respective laminating heads 106 independently of the move made by the rotation of the drum section 102. A head drive unit 108 for a laminating head 106 that has reached the laminating position drives the laminating head 106 such as to offset the advancement of the laminating head 106 made by the rotation of the drum section 102. Each laminating head 106 discharges, onto the lamination stage 30, a unit laminated body W that the laminating head 106 has been holding, so that multiple unit laminated bodies W are laminated.

More specifically, the laminating device 100 includes the drum drive unit 104 that repeatedly outputs a predetermined operation waveform, the multiple laminating heads 106 that are arranged in a circumferential direction of the drum section 102 (main shaft) rotated by the drum drive unit 104 and that respectively hold unit laminated bodies W, and the head drive units 108 that respectively allow the multiple laminating heads 106 to move independently. In the laminating device 100, the operation waveforms of the drum drive unit 104 and a head drive unit 108 are combined, so that the operation waveform of the corresponding laminating head 106 is obtained. At the laminating position, the head drive unit 108 operates to offset the move of the corresponding laminating head 106 made by the drum drive unit 104, so as to adjust the speed of the laminating head 106 to zero.

Thus, by combining the rotation of the drum section 102 and the movement of a head drive unit 108 to stop the corresponding laminating head 106 at the laminating position, a unit laminated body W can be locally stopped at the laminating position to be laminated on the lamination stage 30, without stopping the conveyance of the unit laminated bodies W in the area excluding the laminating position. Accordingly, the speed of manufacturing of the laminated electrode assemblies can be increased. Also, since the unit laminated bodies W can be laminated on the lamination stage 30 with high positional accuracy, laminated electrode assemblies of higher quality can be formed.

As a method for stopping a laminating head 106, for example, providing a cam mechanism on a circumferential edge part of the flange portion 114 may be conceivable. However, when a laminating head 106 is stopped using a cam mechanism, a large impact may be applied to the laminating head 106 at the time of stop. In this case, vibration will remain, which will make lamination with high positional accuracy difficult. Also, waiting for the vibration to subside will reduce the speed of manufacturing of the laminated electrode assemblies. Further, in order to withstand the impact that occurs when the laminating head 106 is stopped, each part needs to have higher rigidity. In particular, to further speed up the manufacturing of the laminated electrode assemblies, the speed of the movement of the laminating head 106 made by the rotation of the drum section 102 will be increased, and the impact at the time when the laminating head 106 is stopped will become greater. Therefore, the required rigidity will also become higher. Also, if such a cam mechanism is provided, the structure will become complicated, and the number of necessary parts will increase.

In contrast, by allowing a laminating head 106 to move in the opposite direction by means of the corresponding head drive unit 108 to offset the move of the laminating head 106 made by the rotation of the drum section 102, the impact that occurs when the laminating head 106 is stopped at the laminating position can be suppressed. Therefore, the manufacturing of laminated electrode assemblies can be sped up while the manufacturing equipment is made simplified.

Also, a head drive unit 108 accelerates, when the corresponding laminating head 106 gets closer to the lamination stage 30 and reaches a position at a predetermined distance from the lamination stage 30, the movement of the corresponding laminating head 106 in the rotating direction of the drum section 102. Accordingly, the time for which the laminating head 106 is stopped at the laminating position can be spared, so that the speed of manufacturing of the laminated electrode assemblies can be further increased. Also, the quality of the laminated electrode assemblies can be further improved.

Also, a head drive unit 108 accelerates, after the corresponding laminating head 106 discharges a unit laminated body W, the movement of the corresponding laminating head 106 in the rotating direction of the drum section 102.

This can allow the subsequent laminating head 106 to advance to the laminating position more smoothly. Therefore, the speed of manufacturing of the laminated electrode assemblies can be further increased.

The manufacturing device 1 for a laminated electrode assembly according to the present embodiment includes: the first electrode cutting drum 2 that cuts a continuous body of multiple first electrode plates into multiple first electrode plates and conveys the first electrode plates; the second electrode cutting drum 6 that cuts a continuous body of multiple second electrode plates into multiple second electrode plates and conveys the second electrode plates; the bonding drum 10 that laminates and bonds the first separator continuous body S1 in which multiple first separators are continuously arranged, multiple first electrode plates supplied from the first electrode cutting drum 2, the second separator continuous body S2 in which multiple second separators are continuously arranged, and multiple second electrode plates supplied from the second electrode cutting drum 6 in this order, so as to form a continuous laminated body 26 in which unit laminated bodies W, which each are constituted by a first separator, a first electrode plate, a second separator, and a second electrode plate, are continuously arranged; the separator cutting drum 12 that cuts the first separator continuous body S1 and the second separator continuous body S2 in the continuous laminated body 26 to obtain multiple unit laminated bodies W; and the laminating drum 14 that is constituted by the laminating device 100 according to the present embodiment and that laminates multiple unit laminated bodies W on the lamination stage 30 to form a laminated electrode assembly. This enables both the quality improvement and the throughput improvement of the laminated electrode assemblies and thus the batteries.

An embodiment of the present disclosure has been described in detail. The abovementioned embodiment merely describes a specific example for carrying out the present disclosure. The embodiment is not intended to limit the technical scope of the present disclosure, and various design modifications, including changes, addition, and deletion of constituting elements, may be made to the embodiment without departing from the scope of ideas of the present disclosure defined in the claims. Such an additional embodiment with a design modification added has the effect of each of the combined embodiments and modifications. In the aforementioned embodiment, matters to which design modifications may be made are emphasized with the expression of "of the present embodiment", "in the present embodiment", or the like. However, design modifications may also be made to matters without such expression. Optional combinations of the abovementioned constituting elements may also be employed as additional modes of the present disclosure. Also, the hatching provided on the cross sections in the drawings does not limit the materials of the objects with the hatching.

The invention claimed is:

1. A laminating device, comprising:
    a plurality of laminating heads that each hold a unit laminated body in which a separator and an electrode plate are laminated;
    a drum section that holds a plurality of the laminating heads arranged on a circumference thereof;
    a drum drive unit that rotates the drum section to advance each laminating head to a laminating position that faces a lamination stage; and
    a plurality of head drive units that move the respective laminating heads independently of the move thereof made by the rotation of the drum section, wherein
    a head drive unit for a laminating head that has reached the laminating position drives the laminating head such as to offset the advancement of the laminating head made by the rotation of the drum section,
    each laminating head discharges, onto the lamination stage, a unit laminated body that the laminating head has been holding, so that a plurality of unit laminated bodies are laminated,
    the drum section includes a discoid flange portion that projects perpendicularly to a rotating shaft of the drum section, and
    the head drive unit includes i) a bracket that supports the laminating heads and that is engaged with the flange portion and ii) a motor supported by the bracket, the head drive unit moving on a circumference of the flange portion when the motor is driven.

2. The laminating device according to claim 1, wherein a head drive unit accelerates, when the corresponding laminating head gets closer to the lamination stage and reaches a position at a predetermined distance from the lamination stage, the movement of the corresponding laminating head in the rotating direction of the drum section.

3. The laminating device according to claim 1, wherein a head drive unit accelerates, after the corresponding laminating head discharges a unit laminated body, the movement of the corresponding laminating head in the rotating direction of the drum section.

4. A manufacturing device for a laminated electrode assembly, the manufacturing device comprising:
    a first electrode cutting drum that cuts a continuous body of a plurality of first electrode plates into a plurality of the first electrode plates and conveys the first electrode plates;
    a second electrode cutting drum that cuts a continuous body of a plurality of second electrode plates into a plurality of the second electrode plates and conveys the second electrode plates;
    a bonding drum that laminates and bonds a first separator continuous body in which a plurality of first separators are continuously arranged, a plurality of the first electrode plates supplied from the first electrode cutting drum, a second separator continuous body in which a plurality of second separators are continuously arranged, and a plurality of the second electrode plates supplied from the second electrode cutting drum in this order, so as to form a continuous laminated body in which unit laminated bodies, which each are constituted by the first separator, the first electrode plate, the second separator, and the second electrode plate, are continuously arranged;
    a separator cutting drum that cuts the first separator continuous body and the second separator continuous body in the continuous laminated body to obtain a plurality of the unit laminated bodies; and
    a laminating drum that is constituted by the laminating device according to claim 1 and that laminates a plurality of the unit laminated bodies on a lamination stage to form a laminated electrode assembly.

* * * * *